United States Patent [19]

Londrigan et al.

[11] Patent Number: 5,308,881
[45] Date of Patent: May 3, 1994

[54] SURFACTANT FOR POLYISOCYANURATE FOAMS MADE WITH ALTERNATIVE BLOWING AGENTS

[75] Inventors: Michael E. Londrigan, Clearwater; Kenneth G. Trout, Tampa, both of Fla.

[73] Assignee: The Celotex Corporation, Tampa, Fla.

[21] Appl. No.: 140,917

[22] Filed: Oct. 25, 1993

[51] Int. Cl.$^5$ ................................. C08J 9/00
[52] U.S. Cl. ................................ 521/112; 521/155; 521/902
[58] Field of Search ................ 521/112, 902

[56] References Cited

U.S. PATENT DOCUMENTS

| | | | |
|---|---|---|---|
| 4,636,529 | 1/1987 | Crooker | 521/131 |
| 4,847,398 | 7/1989 | Mehta et al. | 556/445 |
| 4,857,583 | 8/1989 | Austin et al. | 524/761 |
| 5,124,366 | 6/1992 | Gluck et al. | 521/99 |
| 5,159,096 | 10/1992 | Austin et al. | 556/445 |

*Primary Examiner*—Morton Foelak
*Attorney, Agent, or Firm*—Charles W. Vanecek

[57] ABSTRACT

A closed cell, rigid polyisocyanurate foam which comprises the reaction product of a polyisocyanate and a polyol in the presence of (a) a hydrogen-containing blowing agent or a mixture of a hydrogen-containing blowing agent and at least one co-blowing agent, and (b) a siloxane oxyalkylene copolymer (i) having a molecular weight below about 7500 and an oxyalkylene portion containing greater than 60 weight percent of oxyethylene units and (ii) being prepared by the reaction of an organohydrogensiloxane with a polyoxyalkylene in an essentially solventless system or in the presence of a high boiling point polar polyol.

20 Claims, 1 Drawing Sheet

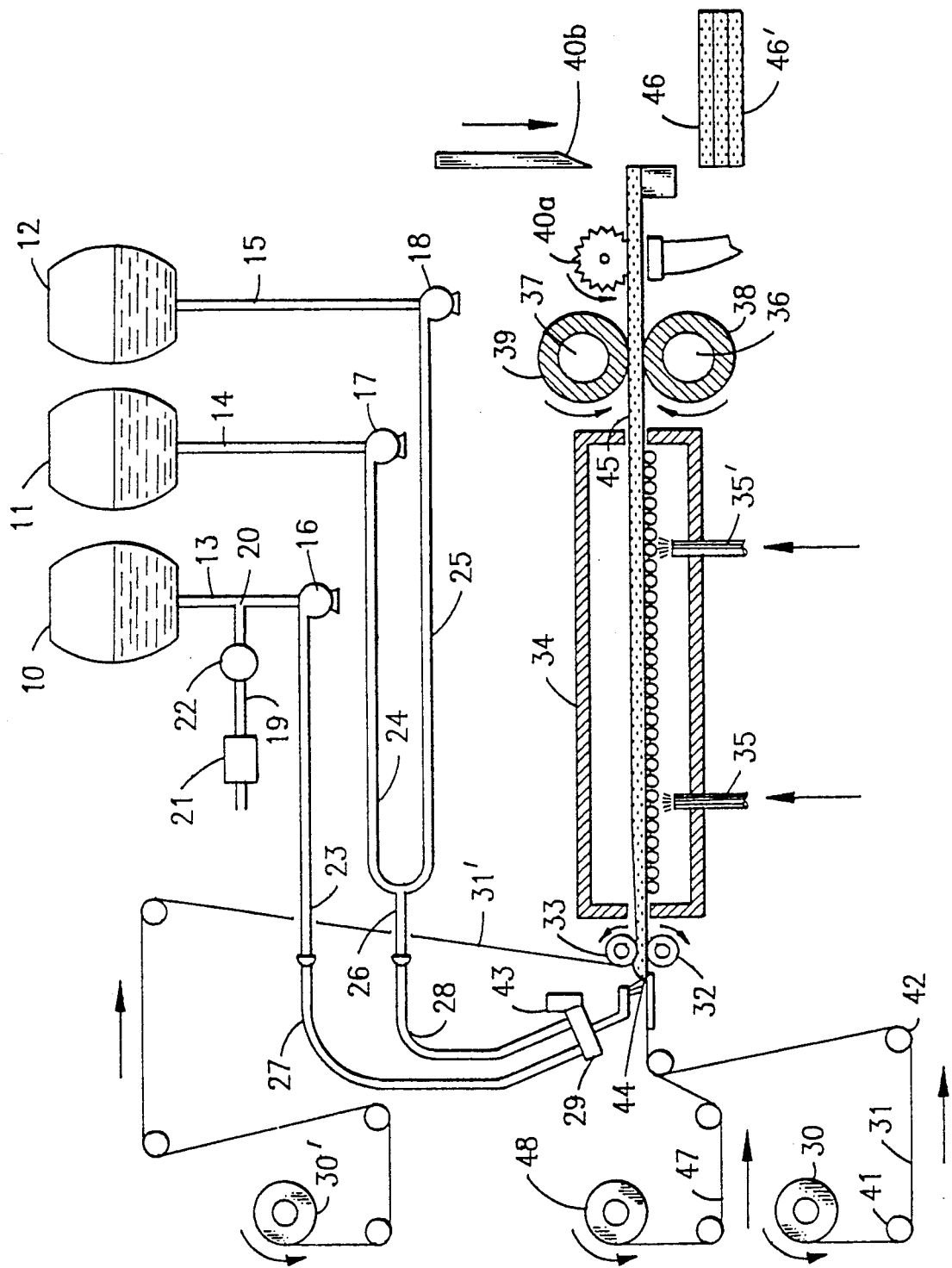

5,308,881

SURFACTANT FOR POLYISOCYANURATE FOAMS MADE WITH ALTERNATIVE BLOWING AGENTS

BACKGROUND OF THE INVENTION

1. Field of the Invention

This invention relates to the preparation of polyisocyanurate insulating foams, and is more particularly concerned with a surfactant for the preparation of such foams from compositions containing blowing agents used to replace the conventional fully halogenated chlorofluorocarbons.

2. Description of the Prior Art

It is well known in the manufacture of rigid polyurethane and polyisocyanurate foams to employ chlorofluorocarbons, such as trichlorofluoromethane, as the blowing agent. These chlorofluorocarbon compounds boil or exhibit a significant vapor pressure at ambient temperatures and are volatilized during the exothermic reaction of an isocyanate with an active hydrogen-containing compound, such as a polyol. The expanding gas is entrapped within the reaction mixture and forms an insulating cellular structure. While the foam industry has had good results using the conventional chlorofluorocarbon blowing agents, such as CFC-11, the agents have come under attack in recent years on the ground that they are believed to give rise to environmental problems concerned with ozone depletion in the stratosphere. Accordingly, the search is ongoing for alternative blowing agents with a low ozone depletion factor to replace the conventional ones.

It is believed that hydrogenated CFC's (also known as HCFC's), which are partially halo-substituted hydrocarbons, present less risk than the CFC's Because the HCFC's contain one or more hydrogen atoms, they more readily dissociate under conditions encountered in the atmosphere, and therefore, less of them would reach the ozone layer of the stratosphere in a form which could cause significant damage. Accordingly, the hydrogen-containing halocarbons have been investigated as possible alternatives for CFC-11 in rigid foam applications.

The search for acceptable alternative blowing agents among hydrogenated CFC's is complicated by the combination of characteristics desired in the foaming operation and finished foam products. Desirable properties include resistance to unacceptable fire or toxicological risks, good compatibility and flowability of the foam-forming components, and low friability and high strength, dimensional stability, facer adhesion, closed-cell content, and thermal insulation value of the foam product. A significant disadvantage of replacing the CFC-11 gas contained within the cells of the foam by the alternative agents is a frequent loss in the initial and aged thermal insulation performance of the foam. If polyisocyanurate foams made with the alternative agents are to remain commercially attractive and be able to comply with various national standards relating to energy consumption, it is important that such foams possess thermal insulation properties which are as close as possible to those of the foams produced with CFC-11.

There still remains a need for a rigid polyisocyanurate foam which has superior properties even though the conventional CFC blowing agents are avoided in its production.

OBJECTS OF THE INVENTION

It is therefore an object of the present invention to provide an improved polyisocyanurate foam material having a combination of advantageous properties, including superior thermal insulation properties.

It is another object of the present invention to provide an improved polyisocyanurate foam from a foam-forming composition which contains both a polyester polyol and a blowing agent having reduced ozone depletion potential.

It is still another object of the present invention to provide a surfactant for the production, from a foam-forming composition containing a polyester polyol and an alternative blowing agent, of a polyisocyanurate foam having a combination of desirable properties, including improved thermal insulation value, an appropriate reactivity profile, a reduced friability, good dimensional stability, and high thermal stability and compressive strength.

It is a further object of the present invention to provide a surfactant whose use in the production of polyisocyanurate foam contributes to improved flow properties of the foam-forming ingredients.

It is a still further object of the present invention to provide closed cell polyisocyanurate foam materials which can be used in building panels which are highly insulating, thermally resistant, soundproof and self-supporting.

BRIEF DESCRIPTION OF DRAWING

The invention will now be described with reference to the accompanying drawing which is a side schematic representation of an apparatus suitable for producing a polyisocyanurate foam material in accordance with the present invention.

SUMMARY OF THE INVENTION

The above objects have been achieved through the use of a low molecular weight polysiloxane polyoxyalkylene copolymer as a foam stabilizer in the production of rigid or semi-rigid cellular isocyanurate foams. The siloxane oxyalkylene copolymer advantageously has a molecular weight below about 7500, preferably below about 6000. The copolymer can be prepared by combining an organohydrogensiloxane with a suitable number of oxyalkylene units to produce the particular low molecular weight desired. Highly useful foam stabilizers are derived from oxyethylene-rich polyethers. The oxyalkylene content of highly satisfactory surfactants is from about 100 to 60 weight percent of oxyethylene units and from about 0 to 40 weight percent of other oxyalkylene units.

The improved polyisocyanurate foam of the invention is prepared from reactants comprising a polyisocyanate and a polyol, preferably a polyester polyol, which are brought together in the presence of the surfactant and alternative blowing agent. The blowing agent suitably comprises at least one hydrogen atom-containing compound, preferably a hydrogen-containing halocarbon, such as HCFC-141b (1,1,1-dichlorofluoroethane). The foaming reaction may be carried out in the presence of auxiliaries and additives as required (e.g., a catalyst).

The polyisocyanate component employed in the preparation of the cellular polymers of the invention can be any of the polyisocyanates known to be useful in the art of polymer formation. A preferred group of polyisocyanates are the aromatic polyisocyanates, especially methylene-bridged polyphenyl polyisocyanate mixtures.

The polyisocyanate is reacted with a polyol component which desirably comprises a polyester polyol or a mixture of a polyester polyol with at least one other isocyanate-reactive compound, such as a polyether polyol. The relative proportions of reactive components are generally such that the equivalent ratio of isocyanate groups to isocyanate reactive groups (e.g., hydroxy groups) is at least about 1.2:1, preferably at least about 2:1. In a preferred embodiment of the invention, the polyol component comprises 50 to 100%, by weight, of a polyester polyol, preferably an aromatic polyester polyol. Especially preferred are the crude polyester polyols obtained by the transesterification of crude reaction residues or scrap polyester resins, as disclosed in U.S. Pat. No. 4,996,242, which disclosure relative thereto is incorporated herein by reference.

DETAILED DESCRIPTION OF THE INVENTION

The polyisocyanurate cellular polymers of the present invention are characterized by improved thermal insulation values brought about by the use of a low molecular weight siloxane oxyalkylene copolymer as a surfactant in the manufacture of the foams. The presence of a cell stabilizing amount of the low molecular weight surfactant, such as less than about 3 percent by weight of the foam-forming composition, leads to a beneficial reduction in foam cell size and a concomitant improvement in insulation value. The special effectiveness of the surfactant stems from its capacity to increase the R-value of rigid polyisocyanurate foams blown with alternative blowing agents, such as the HCFC's.

Of crucial importance in insulating foams is the thermal conductivity of the blowing agent, which contributes to the overall insulating value of the foam. The measured values of the common alternatives to CFC-11, such as HCFC-141b and HCFC-123, show that their conductivity is higher than that of CFC-11. Accordingly, the contribution to the insulation value of a polyisocyanurate foam prepared with these alternates will be less than that of CFC-11. The low molecular weight siloxane oxyalkylene copolymer of the invention helps to counteract the higher thermal conductivity of the HCFC's, and thereby promotes the use of polyisocyanurate foams for insulating applications.

The siloxane oxyalkylene copolymers can be prepared in a known manner. Methods of preparation are illustrated in U.S. Pat. Nos. 4,847,398, 4,857,583 and 5,159,096, the disclosures of which are hereby incorporated by reference. The preparation is conducted so as to provide an appropriate molecular weight and alkylene oxide content. The siloxane oxyalkylene copolymer is desirably prepared by reacting together an organohydrogensiloxane with a polyoxyalkylene in an essentially solventless system, i.e., without added volatile solvent whose boiling point is less than 200° C., or in the presence of a high boiling point polar polyol. The reaction may be promoted by a carboxylic acid, a carboxylic acid salt, or a sodium metal phosphate.

The weight average molecular weight of the organopolysiloxane surfactants is desirably less than about 7000, and suitably is within the range from about 4500 to 6500. The weight average molecular weight of the copolymer can be determined by routine analytical techniques, such as GPC using polystyrene standards.

The polyoxyalkylene portion of the surfactants preferably consists of a major proportion of oxyethylene units with a minor proportion of other oxyalkylene units ($C_nH_{2n}O$) which may be oxypropylene, oxybutylene, etc. A preferred mixture of oxyalkylene units is composed of oxyethylene units and oxy-1,2-propylene units. The oxyethylene units advantageously constitute at least about 70, more preferably 75, weight percent of the surfactant's oxyalkylene units. Surfactants whose oxyalkylene content consists of about 75 to 90 weight percent of oxyethylene units have proved especially valuable in the manufacture of the rigid polyisocyanurate foams. Advantageously, the silicon content of the surfactant is less than about 10, preferably less than about 8, weight percent, and suitably is within the range of from about 4-8 weight percent.

Only small amounts of the siloxane oxyalkylene copolymer, as, e.g., from about 0.1 to 2 percent by weight, need be employed in the foam-forming composition. Prior to its utilization, the organopolysiloxane surfactant may be treated with a conventional agent capable of reacting with the surfactant's hydroxyl groups so as to cap them. This capping treatment makes it possible to store the surfactant with chemicals which would otherwise react with the hydroxyl groups, as, e.g., the isocyanates used in producing the isocyanurate foams.

The polyisocyanurate foams of the present invention can be prepared by using standard techniques known to those skilled in the art. These foams can be simply prepared by polymerizing and foaming the organic polyisocyanate with the polyol in the presence of the surfactant, blowing agent and other additives, such as a catalyst and the like, as necessary, at a suitable temperature, such as from about 0° C. to 150° C. The quantities of reactants are such that the ratio of isocyanate (NCO) groups to hydroxyl (OH) groups is generally from 1.2:1 to 10:1 or higher. This NCO:OH ratio is preferably in the range from about 2:1 to 6:1.

The polyisocyanate component employed in the foam preparation can be any of the polyisocyanates known to be useful in the art of polymer formation. The organic di-or polyisocyanates of the invention include aliphatic, cycloaliphatic, araliphatic, aromatic and heterocyclic polyisocyanates and combinations thereof characterized in having two or more isocyanate (NCO) groups per molecule.

Among the many isocyanates suitable for the practice of the subject invention are, for example, tetramethylene, hexamethylene, octamethylene and decamethylene diisocyanates, and their alkyl substituted homologs, 1,2-, 1,3- and 1,4-cyclohexane diisocyanates, 2,4- and 2,6-methylcyclohexane diisocyanates, 4,4'- and 2,4'-dicyclohexyldiisocyanates, 4,4'- and 2,4'-dicyclohexylmethane diisocyanates, 1,3,5-cyclohexane triisocyanates, saturated (hydrogenated) polymethylenepolyphenylenepolyisocyanates, isocyanatomethylcyclohexane isocyanates, isocyanatoethylcyclohexane isocyanates, bis(isocyanatomethyl)-cyclohexane diisocyanates, 4,4'- and 2,4'-bis(isocyanatomethyl) dicyclohexane, isophorone diisocyanate, 1,2-, 1,3-, and 1,4-phenylene diisocyanates, 2,4- and 2,6-toluene diisocyanate, 2,4'-, 4,4'- and 2,2-biphenyl diisocyanates, 2,2'-, 2,4'- and 4,4'- diphenylmethane diisocyanates, polymethylenepolyphenylene-polyisocyanates (polymericMDI), and aromatic aliphatic isocyanates such as 1,2-, 1,3-, and 1,4-xylylene diisocyanates.

Organic isocyanates containing heteroatoms may also be utilized, for example those derived from melamine.

Modified polyisocyanates, such as carbodiimide or isocyanurate can also be employed. Liquid carbodiimide group- and/or isocyanurate ring-containing polyisocyanates having isocyanate contents from 15 to 33.6 percent by Weight, preferably from 21 to 31 percent by weight, are also effective, for example, those based on 4,4'-, 2,4'-, and/or 2,2'-diphenylmethane diisocyanate and/or 2,4- and/or 2,6-toluene diisocyanate, and preferably 2,4- and 2,6-toluene diisocyanate and the corresponding isomer mixtures, 4,4'-, 2,4', and 2,2'-diphenylmethane diisocyanates as well as the corresponding isomer mixtures, for example, mixtures of 4,4'- and 2,4'-diphenylmethane diisocyanates, mixtures of diphenylmethane diisocyanates and polyphenyl polymethylene polyisocyanates (polymeric MDI), and mixtures of toluene diisocyanates and polymeric MDI. Preferred, however, are the aromatic diisocyanates and polyisocyanates. Particularly preferred are 2,4-, and 2,6-toluene diisocyanate and mixtures thereof (TDI), 2,4'-, 2,2'- and 4,4'-diphenylmethane diisocyanate (MDI), polymethylenepolyphenylenepolyisocyanates (polymeric MDI), and mixtures of the above preferred isocyanates.

Most particularly preferred are the polymeric MDI's.

Still other useful organic polyisocyanates are isocyanate terminated quasi-prepolymers. These quasi-prepolymers are prepared by reacting excess organic polyisocyanate or mixtures thereof with a minor amount of an active hydrogen-containing compound. Suitable active hydrogen containing compounds for preparing the quasi-prepolymers hereof are those containing at least two active hydrogen-containing groups which are isocyanate reactive. Typifying such compounds are hydroxyl-containing polyesters, polyalkylene ether polyols, hydroxyl-terminated polyurethane oligomers, polyhydric polythioethers, ethylene oxide adducts of phosphorous-containing acids, polyacetals, aliphatic polyols, aliphatic thiols including alkane, alkene and alkyne thiols having two or more SH groups; as well as mixtures thereof. Compounds which contain two or more different groups within the above-defined classes may also be used such as, for example, compounds which contain both an SH group and an OH group. Highly useful quasi-prepolymers are disclosed in U.S. Pat. No. 4,791,148 and U.S. application Ser. No. 07/342,508, filed Apr. 24, 1989, the disclosures of which with respect to the quasi-prepolymers are hereby incorporated by reference.

In addition to the polyisocyanate, the foam-forming formulation also contains an organic compound containing at least 1.8 or more isocyanate-reactive groups per molecule. Suitable such compounds include polyols, polyamines, polyacids, polymercaptans and like compounds. Preferred isocyanate-reactive compounds are the polyester and polyether polyols. Particularly preferred are polyester polyols, especially aromatic polyester polyols, and mixtures of the polyester and polyether polyols.

The polyester polyols can be prepared by known procedures from a polycarboxylic acid component comprising a polycarboxylic acid or acid derivative, such as an anhydride or ester of the polycarboxylic acid, and any polyol component. The polyol component advantageously comprises a glycol(s) or a glycol-containing mixture of polyols. The polyacid and/or polyol components may, of course, be used as mixtures of two or more compounds in the preparation of the polyester polyols. Particularly suitable polyester polyols for use in the foam production are aromatic polyester polyols containing phthalic acid residues.

The production of the polyester polyols is accomplished by simply reacting the polycarboxylic acid or acid derivative with the polyol component in a known manner until the hydroxyl and acid values of the reaction mixture fall in the desired range.

After transesterification or esterification, the reaction product can be reacted with an alkylene oxide to form a polyester polyol mixture of the invention. This reaction desirably is catalyzed. The temperature of this process should be from about 80° to 170° C., and the pressure should generally range from about 1 to 40 atmospheres.

The polycarboxylic acid component may be aliphatic, cycloaliphatic, aromatic and/or heterocyclic and may optionally be substituted, for example, by halogen atoms, and/or may be unsaturated. Examples of suitable carboxylic acids and derivatives thereof for the preparation of the polyester polyols include: oxalic acid; malonic acid; succinic acid; glutaric acid; adipic acid; pimelic acid; suberic acid; azelaic acid; sebacic acid; phthalic acid; isophthalic acid; trimellitic acid; terephthalic acid; phthalic acid anhydride; tetrahydrophthalic acid anhydride; pyromellitic dianhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid; terephthalic acid dimethyl ester and terephthalic acid-bis glycol ester.

Polyester polyols whose acid component advantageously comprises at least about 30% by weight of phthalic acid residues are particularly useful. By phthalic acid residue is meant the group

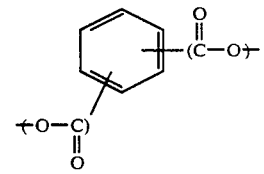

While the aromatic polyester polyols can be prepared from substantially pure reactant materials, more complex ingredients are advantageously used, such as the sidestream, waste or scrap residues from the manufacture of phthalic acid, terephthalic acid, dimethyl terephthalate, polyethylene terephthalate, and the like. Particularly suitable compositions containing phthalic acid residues for use in the invention are (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid and (h) trimellitic anhydride, and (i) combinations thereof. These compositions may be converted by reaction with the polyols of the invention to polyester polyols through conventional transesterification or esterification procedures.

A preferred polycarboxylic acid component for use in the preparation of the aromatic polyester polyols is phthalic anhydride. This component can be replaced by phthalic acid or a phthalic anhydride bottoms composition, a phthalic anhydride crude composition, or a phthalic anhydride light ends composition, as such compositions are defined in U.S. Pat. No. 4,529,744.

Other preferred materials containing phthalic acid residues are polyalkylene terephthalates, especially polyethylene terephthalate (PET), residues or scraps.

Still other preferred residues are DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complex mixture of by-products. The desired DMT and the volatile methyl p-toluate by-product are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process, or, if desired, the residue can be processed further, as, for example, by distillation, heat treatment and/or methanolysis to recover useful constituents which might otherwise be lost, prior to purging the residue from the system. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. Cape Industries, Inc. sells DMT process residues under the trademark Terate ®101. DMT process residues having a different composition but still containing the aromatic esters and acids are also sold by DuPont and others. The DMT process residues to be transesterified in accordance with the present invention preferably have a functionality at least slightly greater than 2.

Such suitable residues include those disclosed in U.S. Pat. Nos. 3,647,759, 4,411,949, 4,714,717, and 4,897,429, the disclosures of which with respect to the residues are hereby incorporated by reference.

The polyester polyols are prepared from the above described polycarboxylic acid components and any polyol component. The polyols can be aliphatic, cycloaliphatic, aromatic and/or heterocyclic. Low molecular weight aliphatic polyhydric alcohols, such as aliphatic dihydric alcohols having no more than about 20 carbon atoms are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like may also be used. Moreover, the polycarboxylic acids(s) may be condensed with a mixture of polyhydric alcohols and amino alcohols.

A preferred polyol component is a glycol. The glycols may contain heteroatoms (e.g., thiodiglycol) or may be composed solely of carbon, hydrogen, and oxygen. They are advantageously simple glycols of the general formula $C_nH_{2n}(OH)_2$ or polyglycols distinguished by intervening ether linkages in the hydrocarbon chain, as represented by the general formula $C_nH_{2n}O_x(OH)_2$. In a preferred embodiment of the invention, the glycol is a low molecular weight aliphatic diol of the generic formula:

HO—R—OH wherein R is a divalent radical selected from the group consisting of:
(a) alkylene radicals each containing from 2 through 6 carbon atoms, and
(b) radicals of the formula:

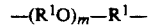

—(R¹O)$_m$—R¹— wherein $R^1$ is an alkylene radical containing from 2 through 6 carbon atoms, and m is an integer of from 1 through 4, and
(c) mixtures thereof.

Examples of suitable polyhydric alcohols include: ethylene glycol; propylene glycol-(1,2) and -(1,3); butylene glycol-(1,4) and -(2,3); hexane diol-(1,6); octane diol-(1,8); neopentyl glycol; 1,4-bishydroxymethyl cyclohexane; 2-methyl-1,3-propane diol; glycerin; trimethylolpropane; trimethylolethane; hexane triol-(1,2,6); butane triol-(1,2,4); pentaerythritol; quinol; mannitol; sorbitol; methyl glucoside; diethylene glycol; triethylene glycol; tetraethylene glycol and higher polyethylene glycols; dipropylene glycol and higher polypropylene glycols as well as dibutylene glycol and higher polybutylene glycols. Especially suitable polyols are alkylene glycols and oxyalkylene glycols, such as ethylene glycol, diethylene glycol, dipropylene glycol, triethylene glycol, tripropylene glycol, tetraethylene glycol, tetrapropylene glycol, trimethylene glycol and tetramethylene glycol, and 1,4-cyclohexanedimethanol (1,4-bis-hydroxymethylcyclohexane).

The term "polyester polyol" as used in this specification and claims includes any minor amounts of unreacted polyol remaining after the preparation of the polyester polyol and/or unesterified polyol (e.g., glycol) added after the preparation. The polyester polyol can advantageously include up to about 40 weight percent free glycol.

The polyester polyols advantageously have an average functionality of about 1.8 to 8, preferably about 1.8 to 5, and more preferably about 2 to 2.5. Their hydroxyl number values generally fall within a range of about 15 to 750, preferably about 30 to 550, and more preferably about 100 to 550, and their free glycol content generally is from about 0 to 40, preferably from 2 to 30, and more preferably from 2 to 15, weight percent of the total polyester polyol component.

Examples of suitable polyester polyols are those derived from PET scrap and available under the designation Terol 235 from Oxid, and Chardol 170, 336A, 560, 570, 571 and 572 and Freol 30-2150 from Cook Composites and Polymers. Examples of suitable DMT derived polyester polyols are Terate ® 202, 203, 204, 214, 254, 254A and 2541 polyols, which are available from Cape Industries. Phthalic anhydride derived-polyester polyols are commercially available under the designation Pluracol ® 9118 from BASF Corporation, and Stepanpol PS-2002, PS-2352, PS-2402, PS-2502A, PS-2502, PS-2522, PS-2852, PS-2852E, PS-2552,and PS-3152 from Stepan Company. Especially useful polyester polyols are Terol 235, Stepanpol PS-2352 and Terate 214 and 2541.

The polyols which can be employed in combination with polyester polyols in the preparation of the polyisocyanurate foam compositions of the invention include monomeric polyols and polyether polyols. Suitable polyether polyols are the reaction products of a polyfunctional active hydrogen initiator and a monomeric unit such as ethylene oxide, propylene oxice, butylene oxide and mixtures thereof, preferably propylene oxide, ethylene oxide or mixed propylene oxide and ethylene oxide. The polyfunctional active hydrogen initiator preferably has a functionality of 2-8, and more preferably has a functionality of 3 or greater (e.g., 4-8).

Any suitable hydrogen atom-containing blowing agent can be employed in the foam compositions of the present invention. The alternative blowing agents can be selected from a broad range of materials, including partially halogenated hydrocarbons, ethers, and esters, hydrocarbons, esters, ethers, and the like. Among the usable hydrogen-containing halocarbons are the HCFC's such as 1,1-dichloro-1-fluoroethane (HCFC-141b), 1,1-dichloro-2,2,2-trifluoroethane (HCFC-123), monochlorodifluoromethane (HCFC-22), 1-chloro-1,1-difluoroethane (HCFC-142b), 1,1-difluoroethane (HCFC-152a), 1,1,1,2-tetrafluoroethane (HFC134a), 1,1,1,4,4,4-hexafluorobutane (HFC-356), 1,1,1,4,4-pentafluorobutane (HFC-365), 1,1,2,2,3,3-hexafluoropropane (HFC-236c,a), 1,1,1,2,3,3-hexafluoropropane (HFC-236e,a), pentafluoroethane (HFC-125), methyl-1,1,1-trifluoroethylether (HFE-263), difluoromethyl-1,1,1-trifluoroethylether (HFE-245), 1,1,2,2,3-pentafluoropropane (HFC-245c,a), and 1,1,1,3,3-pentafluoropropane (HFC-245f,a). Representative hydrocarbons include n-pentane, isopentane, and cyclopentane.

A wide variety of co-blowing agent(s) can be employed in conjunction with the hydrogen-containing halocarbons in preparing the foam compositions of the invention. Water, air, nitrogen, carbon dioxide, readily volatile organic substances and/or compounds which decompose to liberate gases (e.g., azo compounds) may be used. Typically, these co-blowing agents are liquids having a boiling point between minus 50° C. and plus 100° C., and preferably between −50° C. and +50° C.

A preferred method for the production of froth foams of the invention is disclosed in U.S. Pat. No. 4,572,865, whose disclosure is hereby incorporated by reference. In this method, the froth-forming blowing agent can be any material which is inert to the reactive ingredients and easily vaporized at atmospheric pressure. This frothing agent advantageously has an atmospheric boiling point of −50° C. to 10° C. In a desirable embodiment of the invention, a higher boiling blowing agent is used in conjunction with the frothing agent. The former blowing agent advantageously has an atmospheric boiling point ranging from about 10° to 80° C.

The blowing agents are employed in an amount sufficient to give the resultant foam the desired bulk density which is generally between 0.5 and 10, preferably between 1 and 5, and most preferably between 1.5 and 2.5, pounds per cubic foot. The blowing agents generally comprise from 1 to 30, and preferably comprise from 5 to 20 weight percent of the composition. When a blowing agent has a boiling point at or below ambient, it is maintained under pressure until mixed with the other components. Alternatively, it can be maintained at sub-ambient temperatures until mixed with the other components.

Any catalyst that will induce reaction of the isocyanate with the polyol and will induce isocyanurate ring formation can be employed in the foam preparations of the invention. Most commonly used trimerization catalysts also function to catalyze the reaction of polyol and isocyanate to form urethane. However, a separate catalyst may, if desired, be used for urethane formation. The trimerization catalysts include metal carboxylates, tertiary amine trimerization catalysts, quaternary ammonium carboxylates, alkali metal alkoxides, alkali metal phenoxides and the like. Representative metal carboxylates are sodium and potassium formates, acetates, and 2-ethylhexanoates. Tertiary amine catalysts include 1,3,5-tris (N,N-dimethylaminopropyl)-s-hexahydrotriazine, o- and p-(dimethylaminomethyl) phenols and 2,4,6-tris(dimethylaminomethyl) phenol and the quaternary ammonium salts include N-hydroxyl-alkyl quaternary ammonium carboxylates and tetramethylammonium formate, acetate, 2-ethylhexanoate and the like. Suitable urethane catalysts include, for instance, tertiary amines such as triethyl amine or N,N-dimethylethanolamine as well as 1,4-diazabicyclo [2.2.2] octane and organo tin compounds such as dibutyltin diacetate, stannous octoate and dibutyltin dilaurate.

The catalyst or catalyst mixture is used in a catalytically effective amount. Generally, the catalyst comprises from about 0.1 to 20 and preferably from about 0.3 to 10 weight percent of the total foam-forming composition.

Other additives may also be included in the foam formulations. Included are processing aids, viscosity reducers, such as 1-methyl-2-pyrrolidinone, propylene carbonate, nonreactive and reactive flame retardants, such as tris(2-chloroethyl)-phosphate, dispersing agents, plasticizers, mold release agents, antioxidants, compatibility agents, and fillers and pigments (e.g., carbon black). The use of such additives is well known to those skilled in the art.

The present invention also provides a process for producing a laminate which comprises (a) contacting at least one facing sheet with a foam-forming mixture comprising the polyisocyanate, polyol, blowing agent, surfactant, and auxiliaries and additives as required (e.g., a catalyst), and (b) foaming the foam-forming mixture. The process is advantageously conducted in a continuous manner by depositing the foam-forming mixture on a facing sheet being conveyed along a production line, and preferably placing another facing sheet on the deposited mixture. The foam-forming mixture is conveniently thermally cured at a temperature from about 20° C. to 150° C. in a suitable apparatus, such as an oven or heated mold. Both free rise and restrained rise processes, such as disclosed in U.S. Pat. No. 4,572,865, may be employed in the foam production.

Any facing sheet previously employed to produce building panels can be employed in the present invention. Examples of suitable facing sheets include, among others, those of kraft paper, aluminum, glass mats, glass reinforced organic felts, and asphalt impregnated felts, as well as laminates of two or more of the above.

The foam materials of the invention can also be used, with or without a facer(s), for pipe insulation and other insulating purposes.

The foam materials of the invention can contain various reinforcement materials, such as a quantity of glass fibers, as described in U.S. Pat. Nos. 4,118,533 and 4,284,683, the disclosures of which are hereby incorporated by reference.

It is common practice in the manufacture of the rigid cellular polyisocyanurates to utilize two preformulated components, commonly called the A-component and the B-component. Typically, the A-component contains the isocyanate compound that must be reacted with the polyol of the B-component to form the foam, and the remaining foam-forming ingredients are distributed in these two components or in yet another component or components.

In the utilization of the organopolysiloxane surfactants as cellular foam stabilizers, it has proved advantageous to store them in admixture with the polyisocyanate in the A-component. To improve the storage stability of these mixtures, it is desirable that the organopolysiloxane surfactant be treated with a suitable agent to cap its hydroxyl groups before its addition to the mixture. Suitable capping agents are those organic compounds capable of reacting with compounds containing active hydrogen groups, such as hydroxyl groups, as determined by the Zerewitinoff method. The capping agents convert the hydroxyl groups of the organopolysiloxane surfactant to groups which are substantially chemically inert in the cellular foam-forming mixtures of the invention. The capping reaction takes place under conditions well known in the art; as, for example, described in Sandler, S. R. and Karow, "Organic Functional Group Preparations," Organic Chemistry, A Series of Monographs Edited by A. J. Blomquist, Academix Press, New York and London, 1968 Edition, Vol. III, pages 246-247, 1971 Edition, Vol. II, page 223 and 1972 Edition, Vol. III, page 13, the descriptions of which are incorporated herein by reference.

Suitable capping agents include organic acids, monoisocyanates, acid anhydrides, acid chlorides, and acyloxy chlorides, such as a lower alkyl monocarboxylic acid having 1 to 10 carbon atoms selected from the group consisting of acetic acid, propionic acid, butyric acid, hexanoic acid, octanoic acid, decanoic acid, isomers of these acids, anhydrides of these acids, acid chloride derivatives of these acids and mixtures thereof. Acetic anhydride is readily obtainable and convenient to use. Similarly, aromatic acids, anhydrides and chlorides can be employed. Benzoyl chloride and substituted products of it such as 3,5-dinitrobenzoyl chloride are examples of these. Alkyl and aromatic isocyanates can also be employed. Various factors, such as solubility in the organopolysiloxane surfactant being treated and the solubility of the capped surfactant in whatever resin system is to be stabilized, are considerations of which a practitioner in the art is cognizant in selecting the capping system which will yield the desired closed cell stabilized foam. Examples of suitable capping agents are acetic acid, acetic anhydride, acetyl chloride, phenyl isocyanate, and 3,5-dinitrobenzoyl chloride. The preferred capping agents are acetic anhydride and phenyl isocyanate. The capping treatment is typically performed at temperatures ranging from 25° to 140° C. and is advantageously carried out until the surfactant has a hydroxyl value of less than 50, and preferably less than 10. The hydroxyl number is determined by the ASTM-D 1638 test.

Alternatively, the organopolysiloxane surfactants can be used in the foam-forming composition without first being capped. In this case, it is desirable that they not be mixed with materials capable of reacting with their hydroxyl groups, such as isocyanates, until just before the foaming step, i.e., preferably at most a few hours or even only a few minutes before the resin is to be foamed. The surfactants can be used in the A-component, B-component, or in both components, provided they are suitably end-capped when required.

One method of utilizing the surfactant in the foam-forming process of the invention can be illustrated with reference to the apparatus shown in the drawing. The apparatus includes tanks 10, 11 and 12 for containing the foamable ingredients and additives such as isocyanate, polyol, filler, catalyst, dye, blowing agent, etc. The tanks are charged with the foam-forming mixture in whatever manner is convenient and preferred for the given mixture. For instance, the foam-forming mixture can be divided into three liquid components, with the polyisocyanate and surfactant in tank 10, the polyol in tank 11, the catalyst in tank 12, and the blowing agent in tank 10 or 11 or divided between these tanks, each tank respectively connected to outlet lines 13, 14 and 15. When water is used as a co-blowing agent, it is conveniently added to tank 11 or introduced into polyol line 14. The temperatures of the ingredients are controlled to ensure satisfactory processing. The lines 13, 14 and 15 form the inlet to metering pumps 16, 17 and 18. The apparatus is also provided with a storage tank (not shown) for a frothing agent. This tank discharges into conduit 19 which opens at "T"-intersection 20 into line 13. A check valve 21 and ball valve 22 in conduit 19 ensure no backup of material toward the frothing agent storage tank. The frothing agent instead can be introduced in the same way into line 14 or both lines 13 and 14. The pumps 16, 17 and 18 discharge respectively through lines 23, 24 and 25. Lines 24 and 25 comprise branches which open into line 26, and lines 23 and 26 are in turn respectively connected to flexible lines 27 and 28. The flexible lines 27 and 28 discharge to mixing head 29. The apparatus is also provided with a roll 30 of lower facing material 31, and a roll 30' of upper facing material 31'. Where only a lower facing material is used, the upper facing material can be replaced with a web coated with a release agent. The apparatus is also provided with metering rolls 32 and 33, and an oven 34 provided with vents 35 and 35' for introducing and circulating hot air. The apparatus also includes pull rolls 36 and 37, each of which preferably has a flexible outer sheath 38 and 39, and cutting means 40a for cutting off side excess material and 40b for severing the faced foam plastic produced into finite lengths, thereby producing discrete panels.

As an example of the operation, tank 10 is charged with the organic polyisocyanate admixed with the surfactant, tank 11 is charged with the polyol, and tank 12 is charged with the catalyst composition. The blowing agent may be charged to tank 10 or tank 11, or divided between these tanks. The speeds of the pumps 16, 17 and 18 are adjusted to give the desired ratios of the ingredients contained in the tanks 10, 11 and 12, whereupon these ingredients pass respectively into lines 13, 14 and 15. When used, a frothing agent is injected into line 13 upstream of metering pump 16. The ingredients pass through lines 23, 24 and 25, as well as lines 26, 27 and 28, whereupon they are mixed in the mixing head 29 and deposited therefrom. By virtue of rotation of the pull rolls 36 and 37, the lower facing material is pulled from the roll 30, whereas the upper facing material is pulled from the roll 30'. The facing material passes over idler rollers such as idler rollers 41 and 42 and is directed to the nip between the rotating metering rolls 32 and 33. The mixing head 29 is caused to move back and forth, i.e., out of the plane of the drawing by virtue of its mounting on a reciprocating means 43. In this manner, an even amount of material can be maintained upstream of the nip between the metering rolls 32, 33. The composite structure at this point comprising lower and upper facing material 31 and 31' having therebetween a foamable mixture 44 now passes into the oven 34 and on along the generally horizontally extending conveyor. While in the oven 34, the core expands under the influence of heat added by the hot air from vents 35 and 35' and due to the heat generated in the exothermic reaction between the polyol and isocyanate in the presence of the catalyst. The temperature within the oven is controlled by varying the temperature of the hot air from vents 35, 35' in order to ensure that the temperature within the oven 34 is maintained within the desired limits of 100° F. to 300° F., and preferably 175° F. to 250° F. The foam, under the influence of the heat added to the oven, cures to form faced foam plastic 45. The product 45 then leaves the oven 34, passes between the pull rolls 36 and 37, and is cut by side edge and length cutting means 40a and 40b into finite lengths, thereby forming discrete panels 46 and 46' of the product.

Numerous modifications to the above-described apparatus will be immediately apparent to those skilled in the art. For example, the tanks 10, and 12 can be provided with refrigeration means in order to maintain the 15 reactants at subambient temperatures. In one modification, a frothing agent is not delivered into lines 13 or 14, but is admixed with the foam-forming ingredient(s) in tanks 10 and/or 11. This approach is especially advantageous for handlinq large amounts of a highly volatile frothing agent, which can, for example, be apportioned in tanks 10 and 11 which are specially adapted (e.g., pressurized) to hold the frothing agent-containing formulations.

As shown in the drawing, a reinforcing web 47 can be fed into the apparatus. Fiberglass fibers constitute a preferred web material. For example, in a preferred embodiment the reinforcing web will be the type of glass mat used in producing the structural laminate of U.S. Pat. No. 4,028,158, i.e., a thin mat of long, generally straight glass fibers. In accordance with this embodiment, a thin mat 47 of glass fibers is fed from roll 48 toward the nip between the two rotating metering rolls 32 and 33. By virtue of rotation of the pull rolls 36 and 37, reinforcing mat 47 is pulled from its roll, through the nip of the metering rolls and downstream to form part of the resulting structural laminate.

The invention is further illustrated by the following example in which all parts and percentages are by weight unless otherwise indicated.

EXAMPLE

This example illustrates the synthesis and evaluation of polyisocyanurate foams (14% trimer) utilizing as surfactant a siloxane oxyalkylene copolymer of the invention and a number of comparative foam surfactants.

A. FOAM SYNTHESIS

In each foam preparation, the following ingredients of Table I were combined as indicated below:

TABLE I

| PREPARATION OF 14% TRIMER FOAMS | |
|---|---|
| INGREDIENTS | PARTS BY WEIGHT |
| A-Component | |
| Mondur MR-200[1] | 200.7 |
| HCFC-141b | 21.0 |
| Surfactant[2] | 2.2 |
| B-Component | |
| Terol 235[3] | 99.3 |
| HCFC-141b | 21.0 |
| C-Component | |
| Catalyst[4] | 6.0 |

Footnotes:
[1]Mondur MR-200 = polymethylene polyphenyl isocyanate having an equivalent weight of 138, and a viscosity of ~1800 cps at 25° C. (supplied by Miles Inc.).
[2]Surfactant = listed in Table II.
[3]Terol 235 = aromatic polyester polyol having an equivalent weight of 218 and a viscosity at 25° C. of 8200 cps (supplied by Oxid).
[4]Catalyst = mixture employed in the form of a solution in polyethylene glycol (PEG-200) in a 2:1:1:1:2 weight ratio of potassium octoate (70% in diethylene glycol):2,4,6-tris[dimethylaminomethyl]phenol:N,N-dimethylcyclohexylamine:N-hydroxy-isopropyl methyl ammonium salt of formic acid:PEG-200.

The isocyanate, HCFC-141b, and surfactant of the A-Component were blended, cooled to 60° F. and introduced into a reaction vessel. The polyester polyol and HCFC-141b of the B-Component were then added to the vessel, and all ingredients were stirred rapidly for 15-20 seconds. The catalyst was then mixed into the contents of the vessel. All ingredients were thereafter mixed vigorously for an dditional 10 seconds and then poured into a box, yielding a polyisocyanurate foam. The foam was allowed to cure at 70° F./50% R.H. overnight and was thereafter aged under the same conditions.

B. FOAM EVALUATION

Various characteristics of the foams produced are shown in the following Table II. The foam rise height, which is a measure of the foam's flowability, was determined through use of a heated L-mold. The procedure was as follows:

The L-mold, which has both a horizontal and a vertical leg, was preheated to 140° F. The foam synthesis was conducted in a quart can in the manner described above under "A. FOAM SYNTHESIS" and, at the end of the 10 second mix time following injection of the catalyst ("C-Component"), the quart can containing the ingredients was immediately placed into the port of the mold's horizontal leg. The mold port cover was replaced and clamped. The foam was allowed to cure for 5 minutes at the 140° F. mold temperature and then the mold was opened. The maximum rise height of the foam in the vertical leg is shown in Table II.

The Table II results show that Polyisocyanurate Foam A of the invention has overall good properties. Its foam rise height is equivalent or superior to that of Polyisocyanurate Foams B-E made from the comparative surfactants. While comparative Foam C's rise height matches that of Foam A, the latter's initial k-factor is substantially superior. The inventive foam is distinguished by its combination of superior foam flowability and insulating value.

TABLE II

| | | EVALUATION OF SURFACTANT IN POLYISOCYANURATE FOAMS | | | | | | | |
|---|---|---|---|---|---|---|---|---|---|
| | | Surfactant | | | | Foam | | | |
| Foam | Surfactant | EO:PO Ratio | % EO | Molecular Weight | % Si | Density, pcf | Closed Cells, % | K-factor[6], initial | Rise Height, in. |
| A | Y-10764[1] | 5.55 | 80.8 | 5340 | 6.31 | 1.86 | 91.6 | .129 | 19¼ |

TABLE II-continued
EVALUATION OF SURFACTANT IN POLYISOCYANURATE FOAMS

| Foam | Surfactant | Surfactant EO:PO Ratio | % EO | Molecular Weight | % Si | Foam Density, pcf | Closed Cells, % | K-factor[6], initial | Rise Height, in. |
|---|---|---|---|---|---|---|---|---|---|
| B | DC-5098[2] | ∞ | 100.0 | 4710 | 7.98 | 1.86 | 88.6 | .128 | 18¼ |
| C | Y-10222[3] | 1.23 | 48.3 | 7490 | 1.30 | 1.88 | 88.0 | .138 | 19¼ |
| D | DC-198[4] | 2.2 | 62.9 | — | 5.23 | 1.94 | 90.0 | .126 | 17¼ |
| E | DC-190[5] | 1.9 | 59.3 | 14200 | 5.27 | 1.82 | 88.1 | .126 | 16¼ |

Footnotes:
[1]Silicone surfactant supplied by OSi Specialties Incorporated.
[2]Silicone surfactant supplied by Dow-Corning Corporation.
[3]Silicone surfactant supplied by OSi Specialties Incorporated.
[4]Silicone surfactant supplied by Dow-Corning Corporation.
[5]Silicone surfactant supplied by Dow-Corning Corporation.
[6]K-factor expressed in Btu-in/hr-ft²-°F.

We claim:

1. A process for producing a closed cell, rigid polyisocyanurate foam which comprises bringing together under foam-foaming conditions a composition comprising a poly-isocyanate, a polyol, a hydrogen-containing blowing agent or a mixture of a hydrogen-containing blowing agent and at least one co-blowing agent, a trimerization catalyst, and a siloxane oxyalkylene copolymer as the surfactant, the siloxane oxyalkylene copolymer (i) having a weight average molecular weight below about 7500 and an oxyethylene portion containing greater than 60 weight percent of oxyethylene units and (ii) being prepared by the reaction of an organohydrogensiloxane with a polyoxyalkylene in an essentially solventless system or in the presence of a high boiling point polar polyol.

2. The process of claim 1 wherein the polyisocyanate comprises the polymethylene polyphenylisocyanate.

3. The process of claim 1 wherein the polyol is selected from the group consisting of an aromatic polyester polyol and a mixture of an aromatic polyester polyol and at least one other polyol.

4. The process of claim 3 wherein the aromatic polyester polyol is the reaction product of a polycarboxylic acid component and an aliphatic diol of the formula:

HO—R—OH wherein R is a divalent radical selected from the group consisting of:
(a) alkylene radicals each containing from 2 through 6 carbon atoms, and
(b) radicals of the formula:

—(R¹O)$_m$—R¹— wherein R¹ is an alkylene radical containing from 2 through 6 carbon atoms, and m is an integer of from 1 through 4, and
(c) mixtures thereof.

5. The process of claim 4 wherein the acid component of the aromatic polyester polyol is selected from the group consisting of (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof.

6. The process of claim 1 wherein the blowing agent is selected from the group consisting of 1,1-dichloro-1-fluoroethane, monochlorodifluoromethane, 1-chloro-1,1-difluoroethane, 1,1-difluoroethane, 1,1,1,2-tetrafluoroethane and mixtures thereof.

7. The process of claim 6 wherein the blowing agent is 1,1-dichloro-1-fluoroethane.

8. The process of claim 1 wherein the siloxane oxyalkylene copolymer is end-capped for compatibility with the polyisocyanate.

9. The process of claim 8 wherein the siloxane oxyalkylene copolymer has a molecular weight of from about 4500 to 7500.

10. The process of claim 9 wherein the oxyalkylene portion of the siloxane oxyalkylene copolymer contains greater than about 75 weight percent of oxyethylene units.

11. The process of claim 10 wherein the oxyalkylene portion of the siloxane oxyalkylene copolymer contains about 75 to 90 weight percent of oxyethylene units.

12. The process of claim 10 wherein the silicon content of the siloxane oxyalkylene copolymer is less than about 8 weight percent.

13. The process of claim 1 wherein the polyisocyanate is polymethylene polyphenylisocyanate and the polyol is an aromatic polyester polyol.

14. The process of claim 13 wherein the blowing agent is 1,1-dichloro-1-fluoroethane.

15. The process of claim 14 wherein the siloxane oxyalkylene copolymer is end-capped for compatibility with the polyisocyanate.

16. The process of claim 14 wherein the siloxane oxyalkylene copolymer has a molecular weight of form about 4500 to 7500 and the polyoxyalkylene portion is composed of oxyethylene and oxypropylene units.

17. The process of claim 16 wherein the oxyalkylene portion of the siloxane oxyalkylene copolymer has greater than about 75 weight percent of oxyethylene units.

18. The process of claim 17 wherein the silicon content of the siloxane oxyalkylene copolymer is less than about 8 weight percent.

19. The process of claim 18 wherein the siloxane oxyalkylene copolymer is end-capped for compatibility with the polyisocyanate.

20. A process for producing a laminate comprising (a) contacting at least one facing sheet with the foam-forming composition of claim 1, and thereafter foaming and curing the foam-forming composition.

* * * * *